United States Patent [19]
Butler et al.

[11] Patent Number: 5,848,200
[45] Date of Patent: Dec. 8, 1998

[54] METHOD AND APPARATUS FOR PERFORMING TWO DIMENSIONAL VIDEO CONVOLVING

[75] Inventors: Donald S. Butler; Richard S. Amano, both of Scottsdale, Ariz.

[73] Assignee: General Instrument Corporation, Horsham, Pa.

[21] Appl. No.: 523,395

[22] Filed: Aug. 31, 1995

[51] Int. Cl.$^6$ ...................................................... G06K 9/00
[52] U.S. Cl. ........................................... 382/279; 382/232
[58] Field of Search ..................................... 348/580, 583, 348/606, 630, 607, 625; 382/176, 279, 278, 304, 265, 277, 276, 280, 281, 282, 283, 284, 260, 261, 262, 263, 264, 266, 256, 254, 232, 235, 236, 239, 240, 241, 242, 243; 364/604, 757, 724.12, 724.19, 728.01; 375/200; 380/10, 13; 250/550, 559.39, 559.45

[56] References Cited

U.S. PATENT DOCUMENTS

| | | | |
|---|---|---|---|
| 4,282,511 | 8/1981 | Southgate et al. | 340/146.3 |
| 4,330,833 | 5/1982 | Pratt et al. | 364/515 |
| 4,432,009 | 2/1984 | Reitmeier et al. | 358/22 |
| 4,623,923 | 11/1986 | Orbach | 358/166 |
| 4,720,871 | 1/1988 | Chambers | 382/42 |
| 4,750,144 | 6/1988 | Wilcox | 364/728 |
| 4,885,715 | 12/1989 | McCanny | 364/728.01 |
| 4,918,742 | 4/1990 | Simonds | 382/41 |
| 5,151,953 | 9/1992 | Landeta | 382/41 |
| 5,237,402 | 8/1993 | Deshon et al. | 358/520 |
| 5,260,888 | 11/1993 | Sharman | 364/724.05 |
| 5,272,545 | 12/1993 | Mita | 358/464 |
| 5,425,050 | 6/1995 | Schreiber et al. | 375/200 |

FOREIGN PATENT DOCUMENTS

| | | |
|---|---|---|
| 0289970 | 11/1988 | European Pat. Off. . |
| 9423493 | 10/1994 | WIPO . |

OTHER PUBLICATIONS

Danielsson, Per E.: "Serial/Parallel Convolvers", IEEE Transactions On Computers, vol. C–33, No. 7, Jul. 1984, New York, USA, pp. 652–667.

*Primary Examiner*—Leo H. Boudreau
*Assistant Examiner*—Bijan Tadayon
*Attorney, Agent, or Firm*—Volpe and Koenig, P.C.

[57] ABSTRACT

A two dimensional video convolver generates visually acceptable images on a standard television receiver and includes first and second adder stages and two pixel time period delays. The first adder stage simultaneously receives binary data from three adjacent pixels in a predetermined line in a first direction of a picture to be reproduced on a display during each pixel scan period. The binary data of each of three pixels is processed with a predetermined weight to generate a binary first stage output signal representative of a weighted sum of the plurality of the three pixels in the predetermined line. The second adder stage is responsive to the binary first adder stage output signal during a time period for each of three predetermined adjacent lines in a second orthogonal direction of a picture to be reproduced on a display. The second adder stage processes the binary weighted sum of each of the three lines with a predetermined weight to generate a video convolver output signal representative of a weighted sum of the three pixels in a first direction over three adjacent lines in a second orthogonal direction. Weighting is accomplished in the first and second adder stages by using binary data bits for a pixel as received when the weight for that pixel is a numerical one, and by shifting the received binary data bits by a predetermined number of y bits in a first direction to provide a multiply function when a respective weight is greater than one and equals $2^y$.

19 Claims, 2 Drawing Sheets

METHOD AND APPARATUS FOR PERFORMING TWO DIMENSIONAL VIDEO CONVOLVING

CROSS REFERENCE TO RELATED APPLICATIONS

This invention is related to the following applications, all of which are assigned to the assignee of the present invention and have common inventors: U.S. patent application Ser. No. 08/523,396, filed Aug. 31, 1995, now U.S. Pat. No. 5,739,868, issued Apr. 14, 1998 entitled APPARATUS FOR PROCESSING MIXED YUV AND COLOR PALETTIZED VIDEO SIGNALS; U.S. patent application Ser. No. 08/523,789, filed Aug. 31, 1995 entitled VIDEO MAGNIFICATION APPARATUS; and U.S. patent application Ser. No. 08/523,394, filed Aug. 31, 1995 entitled APPARATUS USING MEMORY CONTROL TABLES RELATED TO VIDEO GRAPHICS PROCESSING FOR TV RECEIVERS.

FIELD OF THE INVENTION

The present invention relates to method and apparatus for performing two dimensional video convolving that provides visually acceptable images on a National Standards System Committee (NTSC) or Phase Alternation Line (PAL) television receiver.

BACKGROUND OF THE INVENTION

Convolution techniques are used for a variety of image processing purposes. For two-dimensional images, convolution is employed, for example, for pattern recognition, edge detection, edge enhancement by unsharp masking, spatial frequency filtering, and the deconvolution of images degraded by various aberrations produced in the image formation process.

U. S. Pat. No. 4,623,923 (Orbach), issued on Nov. 18, 1986, discloses a real-time video image enhancement system forming a convolver. The convolver utilizes digital and analog circuits to convolve a digitized video with a user defined mask to generate an analog video output. The convolver comprises nine convolver devices in a 3×3 matrix, where each convolver device comprises a digital-to-analog converter device for receiving a separate digital input of the mask matrix, an element including a plurality of m resistors, and a box including a plurality of four switches. The four switches in the box are used to set up any one of 16 mask values for the associated input. The nine outputs from the nine convolver devices are summed together for transmission on an output line.

U. S. Pat. No. 4,750,144 (Wilcox), issued on Jun. 7, 1988, discloses a 3-by-3 convolver using nine binary arithmetic block units connected in cascade for multiplying 12-bit binary pixel values which are positive or two's complement binary numbers and scaled to 17-bit values in a scaler by 5-bit magnitude weights which may be positive or negative that are stored in three registers. The arithmetic block units are implemented with custom Very Large Silicon Integrated (VLSI) circuit chips wherein a multiplication of a 17-bit pixel value with its 5-bit weight is accomplished by a multiplication algorithm of repeated add and shift operations in each arithmetic block unit. The algorithm for the arithmetic units is implemented for a 17-bit pixel and 5-bit weight with a 17-by-5 array of one-bit full adder circuits for a total of 85 full adder circuits. For all nine arithmetic units for the 3-by-3 convolver a total of 765 full adder circuits are required in addition to registers, nine Exclusive-OR gates for providing proper signed arithmetics for the weights and pixel values, and two scalers.

U. S. Pat. No. 5,151,953 (Landeta), issued on Sep. 29, 1992, discloses a two-dimensional convolver. The convolver comprises (a) receiving means for receiving, in sequence, data words from an M×N array, (b) storing means for storing coefficients associated with the Q×R array which is a subset of the M×N array, (c) a Q×R matrix of multiplying means for multiplying data words with associated coefficients, and (d) an adder at the output of the Q×R matrix of multiplying means for adding the products of multiplication to produce an output convolution value designated Pc. The multiplier matrix comprises nine 8×8 multipliers arranged in three vertical rows. A first input of each multiplier receives a pixel value or a delayed pixel value and a second input receives an associated coefficient which are multiplied together.

The multiplication or division means required in prior art arrangements typically consume significant areas of a silicon chip and are expensive. It is desirable to provide a two dimensional video convolver that operates to closely approximate the function of a television camera, uses simple and cost effective circuitry, and provides visually acceptable images on a National Standards System Committee (NTSC) or Phase Alternation Line (PAL) television receiver.

SUMMARY OF THE INVENTION

The present invention is directed to method and apparatus for performing two dimensional video convolving that closely approximates the function of a television camera and uses simple and cost effective circuitry and provides visually acceptable images of pictures and graphics on a standard National Standards System Committee (NTSC) or Phase Alternation Line (PAL) television receivers.

Viewed from one aspect, the present invention is directed to a two dimensional video convolver comprising first and second adder stages. The first adder stage is responsive to binary data received from a plurality of X pixels in a predetermined line in a first direction of a picture to be reproduced on a video display during each pixel scan period. The first adder stage processes each of the plurality of X pixels with a predetermined weight by using received bits of the binary data of a pixel as received when the weight for that pixel is an integer one, and by shifting the received bits of the binary data by a predetermined number of y bits when the weight is an integer greater than one and is equal to $2^y$, to generate a binary first adder stage output signal. The binary first adder stage output signal corresponds to an averaged result for the plurality of X pixels in the predetermined line in the first direction. The second adder stage is responsive to the binary output signal from the first adder stage during each of X predetermined lines in a second orthogonal direction of the picture to be reproduced on the video display. The second adder stage processes each of plurality of X lines with a predetermined weight by using the binary data of a line in the first direction as received in the output signal from the first adder stage when the weight for that line is an integer one, and by shifting the received bits by a predetermined number of y bits when the weight for that line is greater than the integer one and is equal to $2^y$, to generate a video convolver output signal. The video convolver output signal corresponds to an averaged result for the plurality of X pixels in the first direction over the plurality of X lines in the second orthogonal direction, where $X \geq 3$.

Viewed from another aspect, the present invention is directed a two dimensional video convolver comprising a first adder stage, a delay means, and a second adder stage. The first adder stage is responsive to a reception of binary data from a plurality of three pixels in a predetermined line in a first direction of a video picture to be reproduced on a video display during each pixel scan period. The first adder stage adds the binary data of the plurality of three pixels multiplied by predetermined weights by using received bits of the binary data of a pixel as received when the weight for that pixel is an integer one, and by shifting the received bits of the binary data of the pixel by a predetermined number of y bits when the weight is greater than the integer one and is equal to $2^y$, to generate a binary first adder stage output signal. The binary first adder stage output signal corresponds to an averaged result for the plurality of three pixels in the predetermined line in the first direction. The delay means receives the binary first adder stage output signal and generates therefrom a first delayed output signal corresponding to the binary first adder stage output signal delayed by one pixel scan period, and generates a second delayed output signal corresponding to the binary first adder stage output signal delayed by two pixel scan periods. The second adder stage is responsive to the binary first adder stage output signal and the first and second delayed output signals from the delay means during each of three predetermined lines in a second orthogonal direction of the video picture to be reproduced on the video display. The second adder stage processes the received signals for each of the plurality of three lines with predetermined weights by using bits of the binary data of a line as received from the first adder stage output signal and the first and second delayed output signals when the weight for that line is an integer one, and by shifting the received bits of the binary data for that line by a predetermined number of y bits when the weight for that line is greater than the integer one and is equal to $2^y$, to generate a video convolver output signal. The video convolver output signal corresponds to an averaged result for the plurality of three pixels in a first direction over the plurality of three lines in the second orthogonal direction.

Viewed from still another aspect, the present invention is directed to a method of convolving a three-by-three matrix of binary pixel data received in a two dimensional video convolver to generate a video convolver output signal corresponding to a weighted sum of three adjacent pixels in three adjacent lines. In a first step of the method, binary data for three pixels in a predetermined line in a first direction are simultaneously received during each pixel scan period. In a second step, the received binary data for the three pixels are added in a first adder stage of the video convolver, and each of the binary data for the three pixels is multiplied by a predetermined weight by using bits of the binary data of a pixel as received when the weight for that pixel is an integer one, and by shifting the received bits of the binary data by a predetermined number of y bits when the weight of that pixel is greater than the integer one and is equal to $2^y$, for generating a binary first adder stage output signal. The binary first adder stage output signal corresponds to an averaged result for the plurality of three pixels in the predetermined line in the first direction. In a third step, a first delayed output signal corresponding to the binary first adder stage output signal from the second step delayed by one pixel scan period is generated, and a second delayed output signal corresponding to the binary first adder stage output signal from the second step delayed by two pixel scan periods is generated. In a fourth step, the binary first adder stage output signal from the second step and the first and second delayed output signals from the third step during each of 3 predetermined lines in a second orthogonal direction of the video picture to be reproduced on the video display are added. More particularly, the received signals for each of the plurality of three lines are processed with predetermined weights by using the bits of the binary data of a line as received in the first adder stage output signal and the first and second delayed output signals when the weight for that line is an integer one, and by shifting the received bits of the binary data by a predetermined number of y bits when the weight for that line is greater than the integer one and is equal to $2^y$, to generate the video convolver output signal. The video convolver output signal corresponds to an averaged result for the plurality of three pixels in a first direction over the plurality of three lines in the second orthogonal direction.

The invention will be better understood from the following more detailed description taken with the accompanying drawings and claims.

DETAILED DESCRIPTION

It is to be understood that corresponding elements performing the same function in each of the figures have been given the same designation number.

Due to inherent bandwidth constraints of a standard National Standards System Committee (NTSC) or Phase Alternation Line (PAL) television (TV) system and the interlaced scan format of their television displays, unacceptable visual artifacts are evident when synthetically generated graphics are displayed on such interlaced television displays. More particularly, multiple effects occur in a vertical and a horizontal direction of a display when a high bandwidth video signal is impressed on, for example, an NTSC television receiver. In the vertical direction of the interlaced display, one or more vertically jittering bands can occur in the interlaced TV receiver display. These vertically jittering bands can be seen, for example, when inexpensively produced graphics are displayed over a commercial ad with insufficient filtering. In the horizontal direction, a "moving zipper" effect can be found in a display. The "moving zipper" effect appears as teeth of a zipper that are slowly moving up a display and is actually a flickering occurring on alternate frames of a picture. However, to the human eye it appears as if the flickering is moving up the display in the form of teeth of a zipper.

Figure 1:
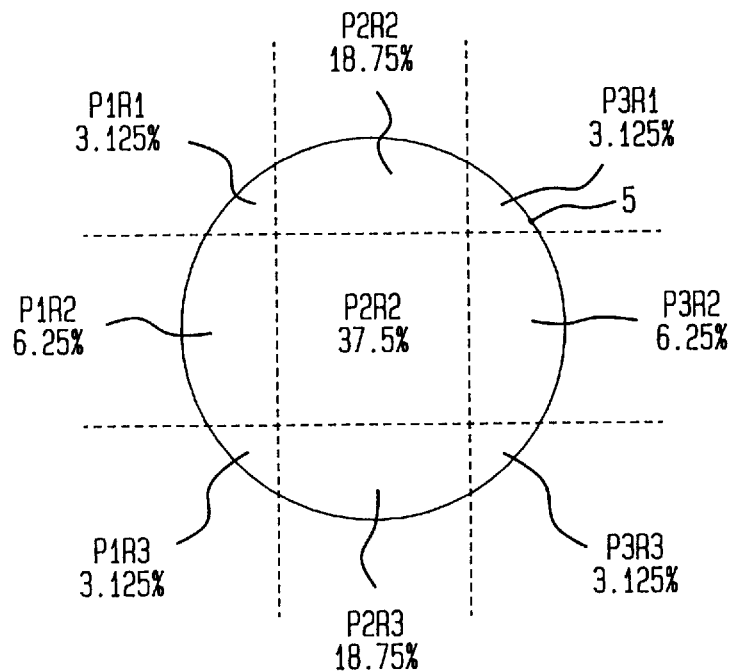
FIG. 1 shows a 3-by-3 pixel matrix diagram associated with a scanning spot on a television camera illustrating nine adjacent pixels and their area factors as percentages in accordance with the present invention.

Referring now to FIG. 1, there is shown a 3-by-3 pixel matrix diagram associated with a scanning spot 5 obtained on a television camera (not shown). The 3-by-3 matrix diagram illustrates nine pixels locations in three adjacent rows of a portion of a picture to be displayed on a television display. Each pixel is labeled as PiRj, where i is a numerical pixel location within a row j of the matrix, and i and j are integers between 1 and 3 depending on their location within the matrix. More particularly, row 1 (R1) is a top row in the matrix diagram associated with the scanning spot 5, and the three pixels of row 1 (R1) are shown as pixels P1R1 to P3R1 as they progress from left to right. The pixels P1–P3 of row 2 (R2) and row 3 (R3) are similarly numbered, and the matrix includes a central pixel P2R2 and the surrounding eight pixels. The nine adjacent pixels of the picture further indicate their associated area factors (%) specifically assigned and used in accordance with the present invention.

It is to be understood that a scanning spot 5 on a television camera (not shown) is not infinitely small. In actuality, the television camera responds to visible light not only from a central pixel (P2R2) of a scan position, but also to a lesser extent from the pixels of a picture surrounding the central pixel (P2R2) of the scanning spot 5. The amount of visible light obtained from the nine pixels of the scanning spot 5 varies essentially by, for example, the amount of the area of each pixel found within the scanning spot 5, etc. As a result, a weighted value (Pix out) for the center output pixel (P2R2) is obtained from a sum of the nine pixel values multiplied by their individual area factors. Such weighted value is expressed as:

$$\text{Pix out} = 0.03125(P1R1+P1R3+P3R1+P3R3)+0.0625(P1R2+P3R2)+0.1875(P2R1+P2R3)+0.375(P2R2). \quad (1)$$

Area factors selected above address two important issues. A first issue is that real multiplications and/or divisions are needed to compute the value for Pix out. Such multiplications or divisions require circuits that normally consume significant areas of a silicon chip. However, the two dimensional video convolver of the present invention is able to be simplified by the use of non-complex adders capable of being integrated in a relatively small area of silicon of a chip for low cost silicon applications. A second issue is that the frequency response of a display is not symmetric in the horizontal and vertical directions. More particularly, a vertical filter that functions with columns of the matrix diagram should have a much lower cut-off frequency than a horizontal filter that functions with rows of the matrix diagram. Therefore, the weighting (area) factors for the nine pixels are not uniform around the center pixel (P2R2). Such nonuniformity results from the horizontal pixel rate being, for example, 74 nanoseconds while the vertical pixel rate (line rate) of an interlaced display is, for example, 63.55 microseconds. The area factors in FIG. 1 are chosen to facilitate circuits which reduce the amount of silicon needed to implement the computation of Pix out in Equation (1) and to accommodate the non-uniformity of the horizontal and vertical pixel rates.

Figure 2:
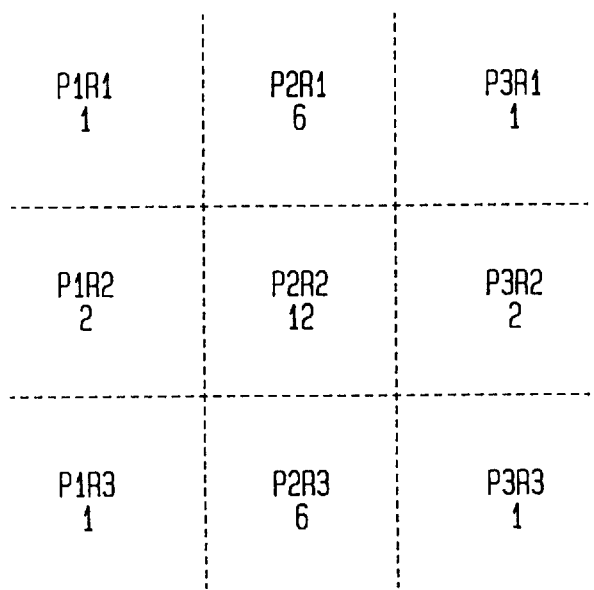
FIG. 2 shows the 3-by-3 pixel matrix diagram of nine adjacent pixels and their area factors as numbers which are formed from the pixel matrix diagram of FIG. 1 in accordance with the present invention.

Referring now to FIG. 2, there is shown a 3-by-3 matrix diagram of pixel values of nine adjacent pixels and their equivalently numbered area factors formed from the pixel matrix diagram of FIG. 1 in accordance with the present invention. More particularly, the pixels P1R1, P1R2, and P1R3 in a first column are provided with integer area factors of 1, 2, and 1, respectively. Similarly, the pixels P3R1, P3R2, and P3R3 in a third column are provided with integer area factors of 1, 2, and 1, respectively. The pixels P2R1, P2R2, and P2R3 in the second column are provided with integer area factors of 6, 12, and 6, respectively. The percentages and integer area factors provided in FIGS. 1 and 2, respectively, provide two important elements. A first element is that the integer values for the area factors in FIG. 2 have a same ratio between corresponding adjacent pixels as the percentages shown for the area factors of FIG. 1. For example, in FIG. 1 the area factors for P1R1 and P1R2 are 3.125% and 6.25%, respectively, which corresponds to a ratio of 1 to 2 as is used by the integer area factors shown in FIG. 2. The area factors for P1R2 and P2R2 are 6.25% and 37.5%, respectively, and correspond to a ratio of 2 to 12 as is used by the integer area factors shown in FIG. 2. Ratios between the other pixels correspond in a similar manner. A second significant element in choosing the above percentages and integer valued area factors is that the total number of units for the area factors in each of the rows of FIG. 1 is a binary number, where the area factors of rows 1 and 3 total to a binary number of 8 and the area factors of row 2 total to a binary number of 16. The total of all units (area factors) is also a binary number of 32. Having summed each of the partial terms, only multiplications and divisions by binary numbers are required to compute the value of Pix out in Equation (1). All of the mathematical operations can be achieved by shifting output bits in a first and second direction, respectively, as will be discussed hereinafter for FIG. 3.

Figure 3:
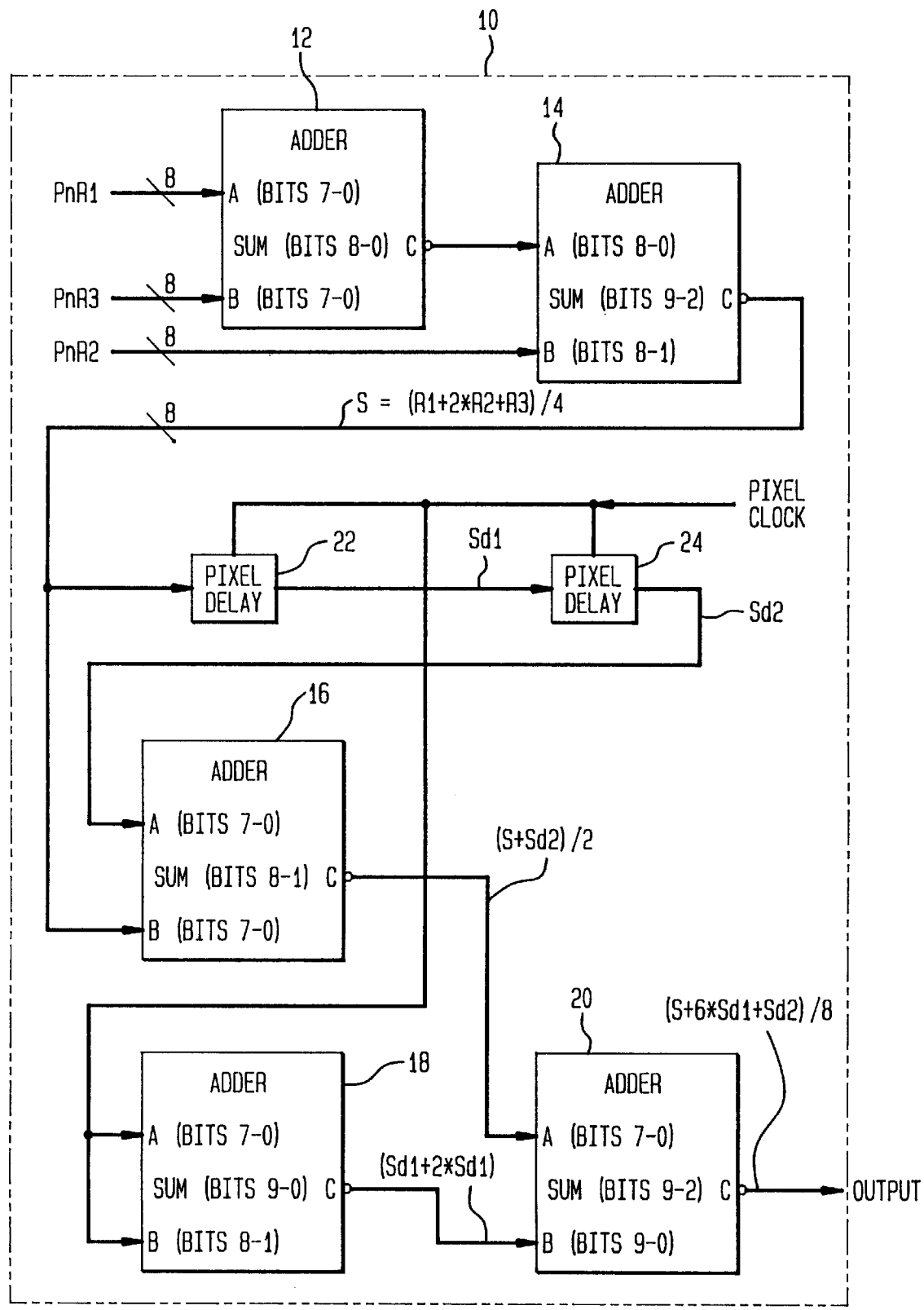
FIG. 3 shows a block diagram of a two dimensional video convolver in accordance with the present invention.

Referring now to FIG. 3, there is shown a block diagram of a two dimensional video convolver 10 (shown within a dashed line rectangle) in accordance with the present invention. The video convolver 10 comprises a first adder 12, a second adder 14, a third adder 16, a fourth adder 18, and a fifth adder 20, and first and second serially connected pixel delays 22 and 24 to achieve pixel averaging (weighting) using 32 units as illustrated above in FIG. 2. The first adder 12 receives binary data indicating values of corresponding pixels from first and third rows in a predetermined column of the 3-by-3 pixel matrix associated with a scanning spot 5 (shown in FIG. 1) at first (A) and second (B) inputs, respectively, and generates at an output (C) a binary sum output signal therefrom. The second adder 14 receives the binary sum output signal from the first adder 12 at a first input (A) thereof and receives binary data indicating a value of a pixel of the second row of the matrix within the scanning spot 5 at an input (B) thereof and generates at an output (C) a binary sum output signal S=(R1+2*R2+R3/4) therefrom, where 2*R2 indicates a weight of 2 multiplied (*) by the binary value of the bits processed for the R2 pixel signal.

The binary sum output signal S from the second adder 14 is received at an input of the first pixel delay 22 and at a second input (B) of the third adder 16. The first pixel delay 22 delays the binary sum output signal S from the second adder 14 by a time necessary to scan a pixel in a row of pixels to generate a first binary delayed output signal Sd1. The first binary delayed output signal (Sd1) from the first pixel delay 22 is received at an input of the second pixel delay 24 which similarly delays the output signal from the first pixel delay 22 by a time necessary to scan a pixel in a row of pixels to generate a second binary delayed output signal Sd2. The third adder 16 receives the second binary delayed output signal Sd2 from the second pixel delay 24 at a first input (A), and adds this output to the binary output signal S from the second adder 14 to generate a binary third adder sum output signal (S+Sd2)/2. The fourth adder 18 receives the first delayed output signal Sd1 from the first pixel delay 22 at both a first (A) and a second (B) input thereof, and generates a binary fourth adder sum output signal (Sd1+2*Sd1) therefrom. The fifth adder 20 receives the binary sum output signal (S+Sd2/2) from the third adder 16 at a first input (A) and the binary sum output signal (Sd1+2*Sd1) from the fourth adder 18 at a second input (B) and generates at an output (C) a binary video convolver sum output (S+6*Sd1+Sd2/8 therefrom which corresponds to a weighted sum of the nine pixels shown in the pixel matrix of FIG. 2.

In operation, the convolver 10 simultaneously receives three corresponding pixels values PnR1, PnR2, and PnR3 located in a vertical of a received picture signal (not shown) at the first input (A) of the first adder 10, the second input (B) of the second adder 12, and the second input (B) of the first adder 10, respectively, during each pixel scan time period. The first and second adders 10 and 12 perform pixel averaging (weighting) using the assigned weights of the pixel matrix of FIG. 2. More particularly, the first adder 12 receives 8-bit values (bits 7-0) for the PnR1 and PnR3 pixels of a vertical (column) of pixels at first (A) and second (B) inputs, respectively, thereof, where Pn represents a pixel of a certain column n. The first adder 12 adds the bits 7-0 of the two binary pixel values for the received PnR1 and PnR3 pixels to generate an output R1+R3 comprising 9 bits (bits 8-0) at the output (C) thereof. It is to be understood that an adding of two 8-bit numbers (bits 7-0) results in a 9-bit number (bits 8-0) which is provided as a binary first adder output signal at output (C). It is to be further understood that the reception of 8-bit values for each of the three pixels in a vertical of the received picture as inputs are only for exemplary purposes and that the pixel values can contain any desirable number of bits.

The second adder 14 receives the binary output signal (bits 8-0) from the first adder at a first input (A), and the binary PnR2 pixel value at a second input (B), where the binary PnR2 pixel value is skewed in the adder 12 to operate on bits 7-0 of an 8-bit PnR2 value as bits 8-1 for the adding process. The skewing of the bits of the PnR2 pixel value by one bit to the left corresponds to multiplying the binary PnR2 pixel value by 2. Adding two 9-bit numbers in the second adder 14 results in a 10-bit (bits 9-0) number, of which only bits 9-2 are transmitted as a binary second adder output signal S at output (C). It should be understood that the dropping of bits 0 and 1 of the sum is effectively corresponds to a divide-by-four function. Therefore, the binary sum output signal (S) from the second adder 14 at output (C) thereof corresponds to S=(R1+2*R2+R3)/4. More particularly, the sum output signal S from the second adder 14 corresponds to the weighted sum of the three pixel values for a predetermined column, where the pixel in a first row (R1) of that column has a weight of 1, the pixel in the second row (R2) of that column has a weight of 2, and the third pixel in the third row (R3) of that column has a weight of 1. As a result, the first and second adders 12 and 14 provide a correctly weighted sum of the values of three pixels in a vertical direction. The video convolver 10 assumes that circuitry (not shown) such as a Dynamic Random Access Memory (DRAM) precedes the first and second adders 12 and 14 to correctly provide three pixels (PnR1, PnR2, and PnR3) from a vertical line simultaneously to the video convolver 10 during each pixel scan period even though the data came from different fields of an interlaced scan. It is to be understood that although a "line" in a TV picture is normally defined as a horizontal line of pixels, a "line" for the purposes of the description of the convolving of pixels of the matrix diagram shown in FIG. 2 by the convolver 10 is understood hereinafter as meaning either a vertical or a horizontal line in the matrix.

The output signal S at the output (C) of the second adder 14 is received at an input of the first pixel delay 22 and a second input (B) of a third adder 16. The first pixel delay 22 is responsive to pixel clock signals to delay the binary output signal from the second adder 14 by one pixel scan period to generate a binary first delayed output signal Sd1. The first delayed output signal (Sd1) from the first pixel delay 22 is transmitted to a second pixel delay 24 which is also responsive to the pixel clock signals to delay the output signal from the first pixel delay 22 by another pixel scan period and generate a binary second delayed output signal Sd2. Therefore, the output signals (S) from the second adder 14, the first pixel delay 22 (Sd1), and the second pixel delay 24 (Sd2) concurrently provide averages for three corresponding pixels Pn in first, second, and third adjacent columns, respectively, of a picture signal.

The third adder 16 adds bits 7-0 from the binary second delayed output signal (Sd2) of the second pixel delay 24 as received at a first input (A), and bits 7-0 of the binary output signal (S) from the second adder 14 as received at a second input (B) to generate a 9-bit sum value of which only bits 8-1 are transmitted as bits 7-0 in a binary third adder output signal. The binary output signal from the third adder 16 represent the sum of (S+Sd2)/2, where the divide by two is obtained from a dropping of bit 0 from the sum value obtained. The output signal (Sd1) from the first pixel delay 22 is received at first (A) and second (B) inputs of the fourth adder 18. However, only bits 7-0 received at the first input (A), and bits 8-1 received at the second input (B) are used in the summing process in the fourth adder 18 to generate a binary fourth adder output signal (bits 9-0) represented by (Sd1+2*Sd1)=(3*Sd1) at an output (C) thereof. A fifth adder 20 adds the output signals (S+Sd2)/2 and (Sd1+2*Sd1)= (3*Sd1) from the third and fourth adders 16 and 18, respectively, using only bits 7-0 of the output signal from the third adder 16 and bits 9-0 of the output signal from the fourth adder 18 to generate a video convolver output signal. The video convolver output signal generated by the fifth adder 20 at an output (C) thereof is equivalent to [(S+Sd2)/2+3*Sd1)/4] which is equivalent to (S+6*Sd1+Sd2)/8. The combination of the divide-by-4 at the output of the second adder 14 and the divide-by-8 at the output of the fifth adder 20 is used scale the output from fifth adder 20 to 8 bits from the overall 32 bits used in the matrix diagram of FIG. 2. In other words, the divide-by-8 and divide-by-4 functions are used to avoid the expansion of the added sums to more than 8 bits for subsequent actions.

From the pixel matrix diagram using 32 units shown in FIG. 2, it can be seen that the corresponding first (PnR1), second (PnR2), and third (PnR3) pixels of the first and third columns represented by the output signals (S) and (Sd2) have the same weighting ratio values of 1, 2, and 1, respectively, in a vertical direction as is provided at the sum output of the second adder 14. Still further, the pixels of the second column as represented by the output signal (Sd1) are provided with weights which are 6 times greater than the weights provided for the pixels of the first and third columns at the output of the fifth adder 20. More particularly, the two dimensional processing is accomplished in two stages where in a first stage three vertical pixels are processed with a 1-2-1 weight and the result is divided by 4 (shifted by two bits). This vertically averaged result for first, second, and third verticals is then processed in a second stage by the horizontal coefficients in a 1-6-1 weighting with a net divide by 8 done as a divide by 2 followed by a divide by 4, again implemented by shifting bits. Therefore, the two dimensional video convolver 10 provides a pixel averaging as is shown in the pixel matrix diagram of FIG. 2 while avoiding the use of more silicon consuming multiplier and/or divider circuits which are typically used in prior art convolvers. As a result, the two dimensional video convolver 10 operates to closely approximate the function of a television camera by providing a scanning spot 5 (shown only in FIG. 1) that is properly weighted and uses relatively simple circuitry that can be implemented in modest areas of silicon. This helps to keep the cost of the two dimensional video convolver 10 relatively low. The two-dimensional video convolver 10 computes a 3-by-3 matrix of pixels at the horizontal pixel rate described hereinbefore as every 74 nanoseconds.

It is to be appreciated and understood that the specific embodiments of the invention described hereinbefore are merely illustrative of the general principles of the invention. Various modifications may be made by those skilled in the art which are consistent with the principles set forth. More particularly, the invention contemplates any configuration, design, and relationship of components which functions in a similar manner, and which will provide the equivalent result. For example, an arrangement may by used to accomplish arithmetic operations by the use of adders, and/or shifting bus interconnections left or right that first provide averaging in a horizontal direction of the pixel matrix of FIG. 2 and then perform an averaging in the vertical direction. Still further, it is to be understood that the present arrangement can use averaging factors other than those shown in FIGS. 1 and 2 which also provide binary numbers when columns or rows are added and permit simple adders and pixel delays to be used with a shifting of bits to achieve multiplications and divisions.

What is claimed is:

1. A two dimensional video convolver comprising:

a first adder stage responsive to binary data received from a plurality of X pixels in a predetermined line in a first direction of a picture to be reproduced on a video display during each pixel scan period for processing each of plurality of X pixels with a predetermined weight by using bits of the binary data of a pixel as they are received when the weight for that pixel is an integer one, and by shifting the received bits of the binary data by a predetermined number of y bits when the weight is an integer greater than one and is equal to $2^y$, to generate a binary first adder stage output signal corresponding to an averaged result for the plurality of X pixels in the predetermined line in the first direction; and a second adder stage responsive to the binary output signal from the first adder stage during each of X predetermined lines in a second orthogonal direction of the picture to be reproduced on the video display, and processing the each of plurality of X lines with a predetermined weight by using bits of the binary data of the line as received in the output signal from the first adder stage when the weight for that line is an integer one, and shifting the received bits by a predetermined number of y bits when the weight for that line is greater than the integer one and is equal to $2^y$, to generate a video convolver output signal corresponding to a weighted sum for the plurality of X pixels in the first direction over the plurality of X lines in the second orthogonal direction, where $X \geq 3$.

2. The two dimensional video convolver of claim 1 wherein X=3 and the first adder stage comprises:

a first adder for receiving binary data associated with a first and a third pixel in a predetermined line in the first direction of the picture to be reproduced on the video display, and for adding each of the binary data for the first and third pixels as multiplied with a predetermined weight to generate a binary first adder output signal corresponding to the weighted sum of the first and third pixels; and a second adder for receiving the binary first adder output signal at a first input, and binary data associated with a second pixel in the predetermined line in the first direction at a second input, and for adding the first adder output signal and the binary data for the second pixel as multiplied with predetermined weights to generate a binary second adder output signal corresponding to the weighted sum of the first, second, and third pixels in the predetermined line.

3. The two dimensional video convolver of claim 2 wherein:

the first adder receives data bits 7-0 associated with the binary data of each of the first and third pixels in a predetermined line and applies a weight of an integer one to each of the data bits, and adds the data bits 7-0 of the first and third pixels to generate the first adder output signal comprising bits 8-0 corresponding to the weighted sum of the first and third pixels; and the second adder receives the data bits 8-0 of the first adder output signal at a first input, and data bits 7-0 of the binary data of the second pixel in the predetermined line at a second input as data bits 8-1 corresponding to the data bits 7-0 multiplied by a weight of 2, and adds the data bits to generate a second adder output signal using bits 9-2 of the binary addition which corresponds to the weighted sum of the first, second, and third pixels in the predetermined line divided by four.

4. The two dimensional video convolver of claim 2 wherein the second adder stage comprises:

delay means for receiving the binary second adder output signal, and generating therefrom each of a first delayed output signal corresponding to the binary first adder stage output signal delayed by one pixel scan period, and a second delayed output signal corresponding to the binary second adder output signal delayed by two pixel scan periods; and adder means for receiving the binary second adder output signal and the first and second delayed output signals from the delay means corresponding to the three predetermined lines in the second orthogonal direction of the picture to be reproduced on the video display, and for processing each of the binary second adder output signals and the first and second delayed output signals as multiplied with predetermined weights to generate a video convolver output signal corresponding to the weighted sum of the three pixels in each of the first, second, and third lines.

5. The two dimensional video convolver of claim 4 wherein the adder means comprises:

a third adder for receiving the binary second adder output signal from the first adder stage and the second delayed output signal from the delay means at a first and a second input, respectively, and for adding the binary values for the output signals to generate a binary third adder output signal corresponding to a weighted sum of the three pixels in each of the first and third lines in the second orthogonal direction;

a fourth adder for receiving the first delayed output signal from the delay means at first and second inputs, and adding the binary values of the output signals to generate a binary fourth adder output signal corresponding to a weighted sum of the three pixels in the second line; and a fifth adder for receiving the binary third and fourth adder output signals at first and second inputs, respectively, and adding the binary values of the output signals to generate the video convolver output signal corresponding to the weighted sum of the three pixels in each of the first, second, and third lines.

6. The two dimensional video convolver of claim 4 wherein:

the third adder receives bits 9-2 of the second adder output signal from the first adder stage as data bits 7-0 at the first input, and the second delayed output signal from the delay means as data bits 7-0 at the second input, and adds the data bits to generate the binary third adder output signal which outputs only data bits 8-1 from the addition that corresponds to a weighted sum of the three pixels in each of the first and third lines in the second orthogonal direction divided by an integer 2;

the fourth adder receives the data bits 7-0 from the first delayed output signal from the delay means at the first and second inputs as data bits 7-0 and 8-1, respectively, and adds the data bits to generate the binary fourth adder output signal as data bits 9-0 which corresponds to the weighted sum of the three pixels in the second line multiplied by three; and the fifth adder receives the third and fourth adder output signals at the first and second inputs as data bits 7-0 and 9-0, respectively, and adds the data bits to generate the video convolver output signal which outputs only data bits 9-2 of the addition which correspond to the weighted sum of the three pixels in each of the first, second, and third lines divided by eight.

7. The two dimensional video convolver of claim 1 wherein the sum of numerical weights assigned to the plurality of X pixels in a predetermined line in the first direction or in the second direction of a picture to be reproduced on a video display represent a binary number in a group consisting of a binary number having a series of 0s and 1s that contains only a single 1 and the total of the numerical weights of all X-by-X pixels in the first and second directions is also equal to a binary number in the defined group.

8. A two dimensional video convolver comprising:

a first adder stage responsive to a reception of binary data from a plurality of three pixels in a predetermined line in a first direction of a video picture to be reproduced on a video display during each pixel scan period for adding the binary data of the plurality of X pixels multiplied by predetermined weights by using bits of the binary data of a pixel as received when the weight for that pixel is an integer one, and by shifting the received bits of the binary data for the pixel by a predetermined number of y bits when the weight to be applied is greater than the integer one and is equal to $2^y$, to generate a binary first adder stage output signal corresponding to an weighted sum of the plurality of 3 pixels in the predetermined line in the first direction;

delay means for receiving the binary first adder stage output signal, and generating therefrom a first delayed output signal corresponding to the binary first adder stage output signal delayed by one pixel scan period, and generating a second delayed output signal corresponding to the binary first adder stage output signal delayed by two pixel scan periods; and a second adder stage responsive to the binary first adder stage output signal and the first and second delayed output signals from the delay means for each of first, second, and third predetermined lines, respectively, in a second orthogonal direction of the video picture to be reproduced on the video display, and processing the signals for each of the plurality of three lines with predetermined weights by using bits of the binary data of a line as received from the first adder stage output signal and the first and second delayed output signals when the weight for a line is an integer one, and by shifting the received bits of the binary data by a predetermined number of y bits when the weight for the line is greater than the integer one and is equal to $2^y$, to generate a binary video convolver output signal corresponding to an weighted sum of the plurality of three pixels in a first direction over the plurality of three lines in the second orthogonal direction.

9. The two dimensional video convolver of claim 8 wherein the first adder stage comprises:

a first adder for receiving binary data associated with a first and third pixel in the predetermined line in the first direction of the video picture to be reproduced on the video display, and for adding the binary data for first and third pixels multiplied with predetermined weights to generate a binary first adder output signal corresponding to the weighted sum of the first and third pixels; and a second adder for receiving the binary first adder output signal and binary data associated with a second pixel in the predetermined line in the first direction, and for adding the binary data of the binary first adder output signal and the second pixel multiplied with predetermined weights to generate a binary second adder output signal corresponding to the weighted sum of the first, second, and third pixels in the predetermined line in the first direction.

10. The two dimensional video convolver of claim 9 wherein:

the first adder receives data bits 7-0 associated with the binary data of each of the first and third pixels in the predetermined line in order to apply a weight of an integer one to the data bits of each of the first and third pixels, and adds the data bits 7-0 of the first and third pixels to generate the binary first adder output signal comprising bits 8-0 corresponding to the weighted sum of the first and third pixels; and the second adder receives the data bits 8-0 of the binary first adder output signal at a first input, and data bits 7-0 of the binary data of the second pixel in the predetermined line at a second input in data bit positions 8-1 corresponding to the data bits 7-0 multiplied by a weight of 2, and adds the data bits to generate a binary second adder output signal that outputs only bits 9-2 of the binary addition which corresponds to the weighted sum of the first, second, and third pixels divided by four.

11. The two dimensional video convolver of claim 10 wherein the second adder stage comprises:

a third adder for receiving the binary second adder output signal from the first adder stage and the second delayed output signal from the delay means at a first and second input, respectively, and for adding the received output signals to generate a binary third adder output signal corresponding to a weighted sum of the three pixels in each of the first and third lines in the second orthogonal direction;

a fourth adder for receiving the first delayed output signal from the delay means at each of first and second inputs, and adding the received output signals to generate a binary fourth adder output signal corresponding to a weighted sum of the three pixels in the second line in the second orthogonal direction; and a fifth adder for receiving the binary third and fourth adder output signals at first and second inputs, respectively, and adding the received binary output signals to generate the video convolver output signal corresponding to the weighted sum of the three pixels in each of the first, second, and third lines.

12. The two dimensional video convolver of claim 11 wherein:

the third adder receives the bits 9-2 of the binary second adder output signal transmitted from the first adder stage in data bit positions 7-0 at a first input, and the second delayed output signal from the delay means as data bits 7-0 at a second input, and adds the data bits to generate the binary third adder output signal which outputs only data bits 8-1 from the addition which corresponds to a weighted sum of the three pixels in each of the first and third lines in the second orthogonal direction divided by an integer 2;

the fourth adder receives data bits 7-0 of the binary first delayed output signal from the delay means at a first and a second input as data bits 7-0 and 8-1, respectively, and adds the data bits to generate the binary fourth adder output signal as data bits 9-0 which corresponds to the weighted sum of the three pixels in the second line in the second orthogonal direction multiplied by three; and the fifth adder receives the binary third and fourth adder output signals at first and second inputs as data bits 7-0 and 9-0, respectively, and adds the data bits to generate the video convolver output signal by transmitting only data bits 9-2 of the addition which correspond to the weighted sum of the three pixels in each of the first, second, and third lines in the second orthogonal direction divided by eight.

13. The two dimensional video convolver of claim 8 wherein the sum of numerical weights assigned to the plurality of three pixels in a predetermined line in the first direction or in the second direction of a picture to be reproduced on a video display represent a binary number in a group consisting of a binary number having a series of 0s and 1s that contains only a single 1 and the total of the numerical weights of all 3-by-3 pixels in the first and second directions is also equal to a binary number in the defined group.

14. A method of convolving a three-by-three matrix of binary pixel data received in a two dimensional video convolver for generating a video convolver output signal corresponding to a weighted sum of three pixels in a first direction or the matrix in three lines in a second orthogonal direction of the matrix, the method comprising the steps of:

(a) simultaneously receiving binary data for three pixels in a predetermined line in the first direction during each pixel scan period;

(b) adding the binary data for the three pixels received in step (a) in a first adder stage of the video convolver and multiplying the binary data for the three pixels by predetermined weights by using bits of the binary data of a pixel as received when the weight for that pixel is an integer one, and by shifting the received bits of the binary data by a predetermined number of y bits when the weight of that pixel is greater than the integer one and is equal to $2^y$, for generating a binary first adder stage output signal corresponding to an weighted sum for the plurality of three pixels in the predetermined line in the first direction;

(c) generating a first delayed output signal corresponding to the binary first adder stage output signal from step (b) delayed by one pixel scan period, and a second delayed output signal corresponding to the binary first adder stage output signal from step (b) delayed by two pixel scan periods in a delay means; and (d) adding the binary first adder stage output signal and the first and second delayed output signals from the delay means for three predetermined lines in a second orthogonal direction of the video picture to be reproduced on the video display, and processing the output signals for each of the plurality of three lines with predetermined weights by using the bits of the binary data of a line as received in the first adder stage output signal and the first and second delayed output signals when the weight for that line is an integer one, and by shifting the received bits of the binary data by a predetermined number of y bits when the weight for that line is greater than the integer one and is equal to $2^y$, to generate the video convolver output signal corresponding to a weighted sum of the plurality of three pixels in a first direction over the plurality of three lines in the second orthogonal direction.

15. The method of claim 14 wherein in step (b), performing the substeps of:

(b1) receiving binary data associated with a first and third pixel in a predetermined line in the first direction of the picture to be reproduced on the video display at a first adder, and adding each of the binary data for the first and third pixels multiplied with predetermined weights to generate a binary first adder output signal corresponding to the weighted sum of the first and third pixels; and (b2) receiving the binary first adder output signal at a first input of a second adder, and binary data associated with a second pixel in the predetermined line in the first direction at a second input of the second adder for adding the first adder output signal and the binary data for the second pixel multiplied with predetermined weights to generate a binary second adder output signal corresponding to the weighted sum of the first, second, and third pixels in the first direction.

16. The method of claim 15 wherein:

in substep (b1), receiving the binary data associated with each of the first and third pixels in a predetermined line data bits 7-0 by the first adder and applying a weight of an integer one to each of the data bits, and adding the data bits 7-0 to generate the binary first adder output signal comprising data bits 8-0 and corresponding to the weighted sum of the first and third pixels; and in substep (b2), receiving the data bits 8-0 of the binary first adder output signal at a first input of the second adder, and data bits 7-0 of the second pixel in the predetermined line at a second input of the second adder as data bits 8-1 corresponding to the data bits 7-0 of the second pixel multiplied by a weight of 2, and adding the data bits to generate the second adder output signal using only data bits 9-2 of the binary addition which corresponds to the weighted sum of the first, second, and third pixels divided by four.

17. The method of claim 16 wherein in step (d) performing the substeps of:

(d1) receiving data bits 9-2 of the second adder output signal from the first adder stage as data bits 7-0 at a first input of a third adder, and the second delayed output signal from the delay means as data bits 7-0 at a second input of the third adder, and adding the data bits to generate a binary third adder output signal which comprises only data bits 8-1 of the addition and corresponds to a weighted sum of the three pixels in each of the first and third lines in the second orthogonal direction divided by an integer 2;

(d2) receiving data bits 7-0 from the first delayed output signal from the delay means at a first and a second input of a fourth adder as data bits 7-0 and 8-1, respectively, and adding the data bits to generate a binary fourth adder output signal comprising data bits 9-0 which corresponds to the weighted sum of the three pixels in the second line multiplied by three; and (d3) receiving the binary third and fourth adder output signals at first and second inputs, respectively, of a fifth adder as respective data bits 7-0 and 9-0, and adding the data bits to generate the video convolver output signal comprising only data bits 9-2 of the addition which correspond to the weighted sum of the three pixels in each of the first, second, and third lines divided by eight.

18. The method of claim 15 wherein in step (d) performing the substeps of:

(d1) receiving the binary second adder output signal from the first adder stage and the second delayed output signal from the delay means at a first and second input, respectively, of a third adder, and adding the output signals to generate a third adder output signal corresponding to a weighted sum of the three pixels in each of the first and third lines;

(d2) receiving the first delayed output signal from the delay means at first and second inputs of a fourth adder, and adding the output signals to generate a binary fourth adder output signal corresponding to a weighted sum of the three pixels in the second line; and (d3) receiving the binary third and fourth adder output signals at first and second inputs, respectively, of a fifth adder, and adding the output signals to generate the video convolver output signal corresponding to the weighted sum of the three pixels in each of the first, second, and third lines.

19. The method of claim 15 wherein in steps (b) and (d) the sum of numerical weights assigned to the plurality of 3 pixels in a predetermined line in the first direction or in the second direction of a picture to be reproduced on a video display represent a binary number in a group consisting of a binary number having a series of 0s and 1s that contains only a single 1 and the total of the numerical weights of all X-by-X pixels in the first and second directions is also equal to a binary number in the defined group.

* * * * *

UNITED STATES PATENT AND TRADEMARK OFFICE
CERTIFICATE OF CORRECTION

PATENT NO : 5,848,200
DATED : December 8, 1998
INVENTOR(S) : Butler et al.

It is certified that error appears in the above-identified patent and that said Letters Patent is hereby corrected as shown below:

In claim 1, at column 9, line 28, before "plurality" insert --the--.

In claim 1, at column 9, line 42, after "processing" delete "the", and after "of" insert --the--.

In claim 6, at column 11, line 1, delete "4" and insert therefor --5--.

In claim 8, at column 11, line 50, delete "an" and insert therefor --a--.

In claim 14, at column 13, line 62, delete "an" and insert therefor --a--.

In claim 19, at column 16, line 19, delete "represent" and insert therefor --represents--.

Signed and Sealed this

Nineteenth Day of October, 1999

*Attest:*

Q. TODD DICKINSON

*Attesting Officer*     *Acting Commissioner of Patents and Trademarks*